J. F. CRAVEN.
SHEET METAL WHEEL.
APPLICATION FILED DEC. 11, 1907.

915,829.

Patented Mar. 23, 1909.
2 SHEETS—SHEET 1.

WITNESSES.

INVENTOR.

J. F. CRAVEN.
SHEET METAL WHEEL.
APPLICATION FILED DEC. 11, 1907.
915,829.
Patented Mar. 23, 1909.
2 SHEETS—SHEET 2.
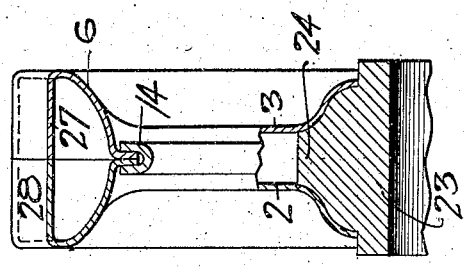
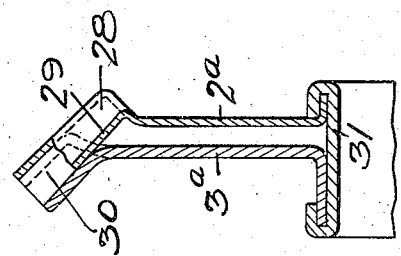
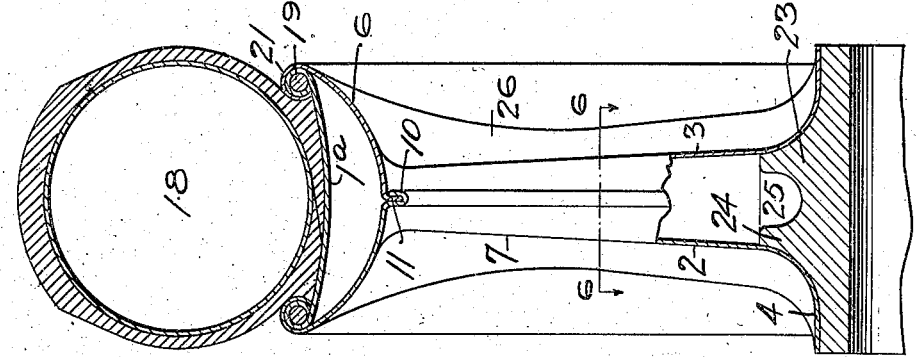
WITNESSES.
INVENTOR.

UNITED STATES PATENT OFFICE.

JAMES F. CRAVEN, OF PITTSBURG, PENNSYLVANIA, ASSIGNOR, BY DIRECT AND MESNE ASSIGNMENTS, TO SAID JAMES F. CRAVEN AND GRANT McCARGO, OF PITTSBURG, PENNSYLVANIA.

SHEET-METAL WHEEL.

No. 915,829.  Specification of Letters Patent.  Patented March 23, 1909.

Application filed December 11, 1907. Serial No. 406,091.

*To all whom it may concern:*

Be it known that I, JAMES F. CRAVEN, a resident of Pittsburg, in the county of Allegheny and State of Pennsylvania, have invented a new and useful Improvement in Sheet-Metal Wheels; and I do hereby declare the following to be a full, clear, and exact description thereof.

This invention relates to sheet metal wheels such as pulley wheels, vehicle wheels, gear wheels, or wheels for other purposes.

The object of the invention is to construct a wheel of thin sheet metal so as to insure lightness, but which nevertheless is strong and which can be cheaply and accurately formed.

The invention comprises a wheel having the construction hereinafter described and claimed.

Figure 2:
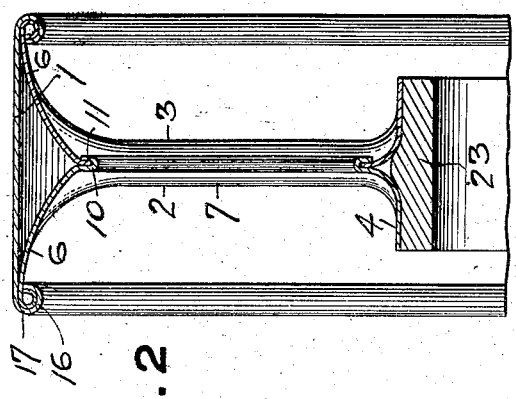
Figure 4:
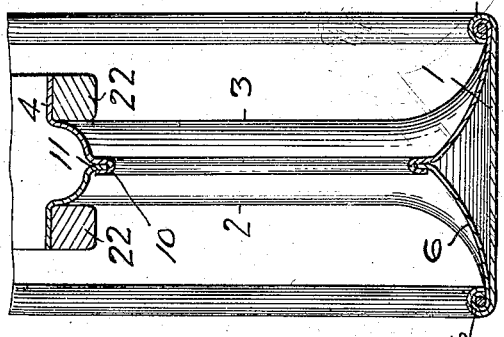
Figure 3:
Figure 1:
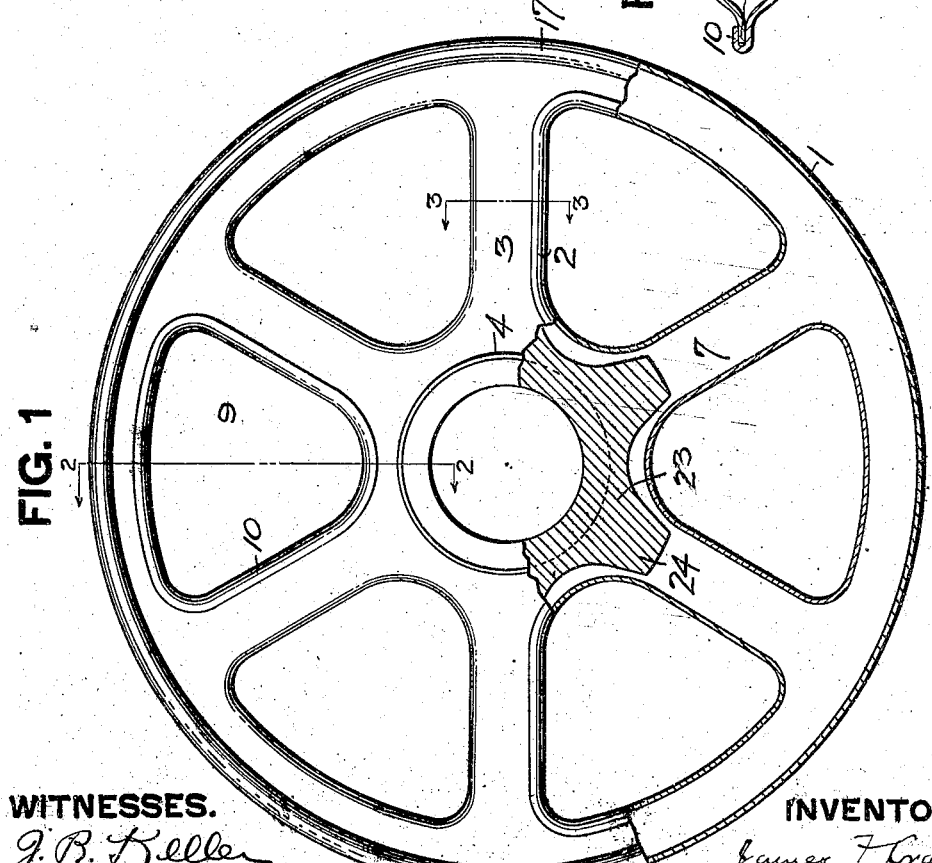

In the accompanying drawings Figure 1 is in part an elevation and in part a vertical section of a pulley wheel constructed according to my invention; Fig. 2 is a radial section therethrough on the line 2—2, Fig. 1; Fig. 3 is a transverse section through one of the spokes on the line 3—3, Fig. 1; Fig. 4 is a radial section showing a modification; Fig. 5 is a similar section of a vehicle wheel constructed according to the invention; Fig. 6 is a transverse section through one of the spokes on the line 6—6, Fig. 5; Fig. 7 is a transverse section through a spoke showing modified means for locking the seam; Fig. 8 is a radial section through a gear wheel embodying the invention; and Fig. 9 is a similar view showing a modification.

My improved wheel is formed of three main portions, namely, a rim portion 1 and two body or spider portions 2 and 3. The body portions 2 and 3 are preferably duplicates of each other and are formed from thin sheet metal by pressing between suitable dies. Each comprises the annular central or hub portion 4 having its edges turned out to form a practically tubular part, an annular rim portion 6 whose edges are turned or flared outwardly, as shown in Fig. 2, and the radial spoke portions 7 extending from the annular hub portion 4 to the annular rim portion 6 and forming the union between the same. These parts are pressed to the desired shape, examples of which are shown in Figs. 2, 4, 5 and 8, and two thereof are placed back to back and suitably secured together. This union may be effected in several ways, but preferably by a locking or binding strip of metal at the edges of the members around the openings or holes 9 bounded by the spokes, hub and rim portions. As shown in Figs. 1 to 6, the locking or binding strip of metal 10 is formed as an extension of one of the body members 2 or 3, being formed by merely cutting out less metal between the spoke, hub and rim portions so as to leave the edges on one body member projecting beyond those of the other body member, which projecting edges are folded over and crimped down onto the edge portions 11 of the other member, as shown in the drawings. Preferably the extended binding portion 10 at the edges surrounding the openings 9 is formed alternately on the two members, as indicated by the cross sections, Fig. 3 and 6, so that the metal on one edge of a spoke is folded in one direction and that on the opposite edge of the spoke is folded in the opposite direction, thereby insuring balancing of the stresses, a truer pulley, and also making it possible to make the two body members on the same set of dies, that is, as duplicates. Instead of having the binding member formed as an integral extension on one of the plates it may be a separate strip of metal, as shown at 14, Fig. 7. In case of small sized pulleys, for instance, it may be desirable to make the body members of very thin sheet metal, in which event the strip 14 may be made of heavier metal and crimped or folded over the edges of the body members as shown, thus securely binding them together. In this manner the two members of the body are rigidly united to form tubular spokes with locked seams, thereby getting great strength for the weight of metal used.

The rim 1 will be varied according to the character of the wheel to be formed. For pulleys this rim is shown as a thin plate having its edges secured to the edges of the body or spider portion; preferably by beading, as shown. The outwardly flaring edges of the body members are first beaded as shown at 16 and the edges of the rim then beaded over the same, as at 17, getting a very rigid and tight construction. If desired, a strengthening wire may be inclosed in the bead, as is common in sheet metal work, and as shown in Fig. 4.

Fig. 5 shows a rim adapted for vehicle purposes to receive a pneumatic or cushioned tire 18. In this case the outwardly flaring portions 6 of the body members are curved concavely instead of convexly, and the rim 1ª is also concave, having its edges beaded around strengthening wires or rods 19 and the edges of the flaring portion 6 of the body beaded over the same as at 21. For other forms of wheels the rim can be varied as described.

The hub may also be of various constructions. For very light pulleys the tubular hub portions 4 of the body may be fitted directly upon the shaft to which the pulley is to be applied, a clamping ring 22 being applied outside the same as shown in Fig. 4. Preferably, however, and especially for pulley wheels or vehicle wheels subjected to considerable strain, a cast or forged hub 23, such as shown in Figs. 1, 2, 5 and 8 is employed. This hub is shaped to fit the tubular portion of the sheet metal body, being provided with radial projections or bosses 24 projecting up into each of the spokes and holding the hub member against rotation. These bosses may be cored out as at 25 for the sake of lightness.

The shape of the parts, and especially the cross section of spokes, is varied according to the use to which the wheel is to be put and to give the necessary strength. For pulleys which are not subjected to great lateral stress the spokes may be practically oval in shape, as shown in Fig. 3. For a wheel subjected to a greater lateral stress the spokes may be provided with lateral ribs 26, as shown in Fig. 7, which lateral ribs may project sufficiently far to make the lateral diameter of the spokes greater than the diameter in the plane of the wheel, as shown in Fig. 6. The latter figure shows a spoke adapted especially for the vehicle wheel shown in Fig. 5, where severe lateral stresses are encountered. It will also be noticed that in this figure the spokes widen out at top and bottom, until practically of the width of the rim and hub members, whereas in Figs. 2 and 4 the spoke is shown materially narrower, and while flaring laterally at top and bottom, not to the same extent as in Fig. 5. Figs. 2 and 4 show spokes of the same diameter for their entire length, but if desired the spoke may be tapered from the hub outwardly toward the rim as necessary or desirable.

Fig. 8 shows the invention applied to a gear wheel having substantially the same body and hub construction as the pulleys, the separate locking strip 14 being used, and having the rim integral with the body, such as bending the flaring portions 6 inwardly, as at 27, until they touch. The teeth 28 are pressed in the face of the rim portions 27.

Fig. 9 shows a modification in which the body portions 2ª and 3ª are in the form of disks, one of which has its outer edge bent to an incline to form a bevel face 29 in which the teeth 28 are pressed, while the other disk is of heavier metal with its outer edge inclined and corrugated, as at 30, and filling into the back face of the inclined part 29 of the front disk. The disks are united at the hub by the member 31, or otherwise. If desired, the gear faces of the gear wheels may be in a separate piece suitably secured to the body portion, instead of being integral therewith, as shown.

The wheel described consists of only four principal portions, namely, the two body members, the rim and the solid hub, while in the gear wheel shown, only three principal parts are employed. In manufacturing, the body members are pressed up from sheet metal, both members being duplicates with the projecting edge portions 10 to form the crimp turned at right angles to the web, and are then placed back to back with the solid hub 23 between them, the projecting edge portions 10 extending through the openings in the opposite body member and across the edges of the latter, and are subjected to further die actions to fold the projecting edge portions 10 over the edges of the opposite body member around the openings 9, as shown, or to apply a separate binding strip, as desired, so that by this die operation the members are united and the hub assembled therewith. When making a pulley wheel as in Figs. 1 to 4, the peripheral edges of the body portion are then beaded, after which the rim 1 is applied and beaded over the beads on the body portion. When following the construction shown in Fig. 5 the edges of the rim portion are first beaded over the wires 19 and the rim then applied to the body and the edges of the latter beaded over the edges of the rim. All of the operations described can be performed with suitable sheet metal working apparatus, such as dies and crimping rolls and according to methods which are well understood by sheet metal workers.

The wheel has tubular spokes with crimped or interlocked seams, said spokes being integral with the periphery or rim attaching portion and the central or hub attaching portion, thereby giving a very strong construction and providing a wheel of light weight, which is important for many uses and is also important from the standpoint of the cost of material. The operations can be quickly performed so that the labor cost is small, and as practically all of the work is die work a true wheel is insured.

What I claim is:

1. A sheet metal wheel having a body composed of two substantially similar members cut out to provide annular hub and rim and radial spoke portions, said members having extended edge portions provided alternately on the two members at the several openings between hub, rim and spokes, said extended edge portions being folded around the edges of the other member.

2. A sheet metal wheel comprising two substantially similar disks provided with openings between hub and rim and having their edges at said openings projecting in a plane transverse to the axis of the wheel, one of said edges being folded around and over the other edge, the folded edge being alternately on opposite disks at the several openings.

3. A wheel comprising a sheet metal body including hollow spokes, and a solid hub inclosed in said body and having radial projections extending into the spokes.

4. A wheel comprising two sheet metal body members each comprising integral hub and rim portions and spokes, said members being united to form tubular spokes, and a solid hub in the opening formed by the hub portion and having radial projections extending into the spokes.

5. A sheet metal wheel having a body composed of two substantially similar members cut out to provide annular hub and rim and radial spoke portions, said members being placed back to back and united, and a hub in the opening formed by the hub portion of the body and having radially projecting portions engaging the spokes.

In testimony whereof, I the said JAMES F. CRAVEN have hereunto set my hand.

JAMES F. CRAVEN.

Witnesses:
ROBERT C. TOTTEN,
J. R. KELLER.